(12) United States Patent
Kawamoto et al.

(10) Patent No.: US 7,678,188 B2
(45) Date of Patent: *Mar. 16, 2010

(54) ULTRAFINE PARTICLES OF PRUSSIAN BLUE-TYPE METAL COMPLEX, DISPERSION LIQUID THEREOF AND THEIR PRODUCTION METHODS

(75) Inventors: Tohru Kawamoto, Ibaraki (JP); Hisashi Tanaka, Ibaraki (JP); Masato Kurihara, Yamagata (JP); Masatomi Sakamoto, Yamagata (JP); Mami Yamada, Chiba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/816,489

(22) PCT Filed: Feb. 8, 2006

(86) PCT No.: PCT/JP2006/302135

§ 371 (c)(1),
(2), (4) Date: Apr. 28, 2009

(87) PCT Pub. No.: WO2006/087950

PCT Pub. Date: Aug. 24, 2006

(65) Prior Publication Data

US 2009/0211494 A1 Aug. 27, 2009

(30) Foreign Application Priority Data

Feb. 17, 2005 (JP) ............................. 2005-040823

(51) Int. Cl.
- C09C 1/26 (2006.01)
- C01C 3/11 (2006.01)
- B01J 19/00 (2006.01)
- B82B 1/00 (2006.01)
- B82B 3/00 (2006.01)

(52) U.S. Cl. .................................... 106/458; 423/367
(58) Field of Classification Search ................ 106/458; 423/367

See application file for complete search history.

(56) References Cited

U.S. PATENT DOCUMENTS

| 3,694,149 A | * | 9/1972 | Matsumoto et al. | ....... 23/293 R |
| 3,885,921 A | * | 5/1975 | Matsumoto et al. | ........... 23/300 |
| 4,451,339 A | * | 5/1984 | Kranz et al. | ................ 205/479 |

FOREIGN PATENT DOCUMENTS

| JP | 51-28600 A | | 3/1976 |
| JP | 52-6399 A | * | 1/1977 |
| JP | 59-161478 A | | 9/1984 |
| JP | 62-151469 A | * | 7/1987 |
| JP | 1-219723 A | | 9/1989 |
| WO | WO2008/081923 A1 | * | 7/2008 |

OTHER PUBLICATIONS

International Search Report of PCT/JP2006/302135, date of mailing May 2, 2006.

* cited by examiner

*Primary Examiner*—Anthony J Green
(74) *Attorney, Agent, or Firm*—Westerman, Hattori, Daniels & Adrian, LLP

(57) ABSTRACT

Disclosed is a method for producing ultrafine particles of a Prussian blue-type metal complex wherein (A) an aqueous solution containing an anionic metal cyano complex having a metal atom M1 as the central metal is mixed with an aqueous solution containing metal cations of a metal atom M2 for precipitating a crystal of a Prussian blue-type metal complex having the metal atom M1 and the metal atom M2; then (B) a solution obtained by dissolving a ligand L in a solvent is mixed with the crystal of the Prussian blue-type metal complex for forming a dispersion liquid of ultrafine particles of the Prussian blue-type metal complex; and the (C) the Prussian blue-type metal complex is separated from the dispersion liquid as nanometer-sized ultrafine particles.

11 Claims, 10 Drawing Sheets

100nm

100nm

50nm

ULTRAFINE PARTICLES OF PRUSSIAN BLUE-TYPE METAL COMPLEX, DISPERSION LIQUID THEREOF AND THEIR PRODUCTION METHODS

BACKGROUND OF THE INVENTION

1. Field of the Invention

The present invention relates to the superfine particles of Prussian blue-type complexes, their dispersion liquid, and a fabrication method of these materials, and more specifically relates to the superfine particles of Prussian blue-type complexes with nanometer-scale size, their dispersion liquid, and a fabrication method of these materials.

2. Description of the Related Art

Metal-complexes consisting of the particular metals and particular coordination molecules show various properties depending on the combination of the kind of metals and the kind of the coordination molecules. These materials have a much broader range of applications, for example, drugs, luminescent materials, coating medium, etc.

On the other hand, the fabrication of the superfine particles of bulk materials often drives a novel character that never appears in the bulk. Such an appearance of the novel characters has extensively been studied and used. However, synthesizing superfine particles of the metal complexes have been started only in this decade.

Among the metal-complexes, Prussian blue and its analogues, so-called Prussian blue-type complexes, have extensively been studied. Prussian blue has used as a blue pigment from the 18th century. Furthermore, it has potential applications for displays, smart windows, and biosensors.

FIG. 10 shows the crystal structure of the Prussian blue-type complexes. In the present invention, the crystal of the Prussian blue-type complexes includes the modified structure from the crystal of the Prussian blue, such as the substitution or the defect of the transition metals and hexacyano-metallic group, intercalation of the various ions or waters.

The crystal structure has a three-dimensional network structure with two kinds of metal atoms M1 and M2 with NaCl-type network connected by cyano-groups consisting of the carbon atoms 102 and nitrogen atoms 103. As the metallic atoms M1 and M2, various elements such as Vanadium, Chromium, Molybdenum, Tungsten, Manganese, Iron, Ruthenium, Cobalt, Nickel, Platinum, Copper can be used. Because various character such as magnetism or optical properties by the substitution of the metallic atoms, various kind of materials has been studied (Patent. 1, 2).

In the fabrication of the stable superfine particles of the Prussian blue-type complexes, dispersibility in solvents is very important. If the stable dispersibility of the superfine particles in various solvents, various inexpensive and simple method can be used for fabricating films, such as spin-coating. Then the film will be utilized for various applications such as biosensor.

Therefore, how to fabricate superfine particles is very important for practical application of the Prussian blue-type complexes. There have been a few reports of the method to fabricate superfine particles. In these reports, as the materials for stabilizing superfine-particles, surface active agent such as di-2-ethylhexylsulfosuccinate sodium salt (AOT), polyers as poly(vinylpyrrolidone (PVP), or ferritin proteins were used for (M Yamada, et al.: J. Am. Chem. Soc., 126 (2004) p9482.). But they do not suit for inexpensive and simple mass production because of their complexity of the synthesizing process, their expensive price of the stabilizing molecules, or requirement of enormous volume of solvents.

Reference 1: Japanese Patent Disclosure 2005-3679
Reference 2: Japanese Patent Disclosure Heisei 7-270831

The conventional fabrication method of the superfine-particles such as reversed micelle method limits the kinds of the stabilizing materials that cover the surface of the superfine-particles. The reversed micelle method has three processes, (i) the process of synthesizing the 1st reversed micelle solution of hexacyano metallic complexes (anion) and the 2nd reversed micelle solution of the metal ion solution, (ii) the process of the mixing the 1st reversed micelle solution and the 2nd reversed micelle solution, and (iii) the process of the synthesizing superfine particles by adding molecules to cover the surface (surface-covered molecule) into the mixed solution obtained in the process (ii). In the case of the reversed micelle method, a large amount of the surfactant to form the reversed micelle in addition to the surface-covered molecule is required. A large amount of the organic solvent is also used, resulting in that this method is not inexpensive. Furthermore, this method has less versatility because the kinds of the solvents, surface-covered molecules, and surfactant used in this method are limited due to the requirement of the stable structure of the reversed micelles.

3. SUMMARY OF THE INVENTION

Consequently, the purpose of the present invention is to supply the method to fabricate the superfine particles of the Prussian blue-type complexes easily, massively, and efficiently. Furthermore the superfine particles of the Prussian blue-type complexes dispersing into various solvents stably to suit to the industrial production, their solution, and the synthesizing method of them are also the purposes of the present invention.

Above-mentioned problem is solved by the following method.

The method of producing superfine particles of a Prussian blue-type metal complex includes the following steps (A)-(C):

(A) mixing an aqueous solution that comprises an anionic cyano-metal-complex having a metal atom $M_1$ as a central metal and an aqueous solution that comprises a metal cation of a metal atom $M_2$, to precipitate crystals of a Prussian blue-type metal complex including the metal atom $M_1$ and the metal atom $M_2$; then (B) mixing the crystals of the Prussian blue-type metal complex and a solution of a ligand L dissolved into a solvent, to obtain a dispersion liquid containing superfine particles of the Prussian blue-type metal complex; and (C) separating the Prussian blue-type metal complex from the dispersion liquid for forming the superfine particles in a nanometer size.

The method of producing superfine particles can include the following steps (A)-(C):

(A) mixing an aqueous solution that comprises an anionic cyano-metal-complex having a metal atom $M_1$ as a central metal and an aqueous solution that comprises a metal cation of a metal atom $M_2$, to precipitate crystals of a Prussian blue-type metal complex including the metal atom $M_1$ and the metal atom $M_2$; then (B1) mixing the crystals of the Prussian blue-type metal complex and a solution of a ligand L dissolved into an organic solvent, to obtain a dispersion liquid containing superfine particles of the Prussian blue-type metal complex; and (C) removing the solvent from the dispersion liquid, to obtain solid-powder-shaped superfine particles of the Prussian blue-type metal complex in which the particles have an average particle diameter of 50 nm or less.

In the method of producing superfine particles of a Prussian blue-type metal complex, the solution of the ligand L, dissolved in the organic solvent, can contain water.

The method of producing superfine particles of a Prussian blue-type metal complex can include the following steps (A)-(C):

(A) mixing an aqueous solution that comprises an anionic cyano-metal-complex having a metal atom $M_1$ as a central metal and an aqueous solution that comprises a metal cation of a metal atom $M_2$, to precipitate crystals of a Prussian blue-type metal complex including the metal atom $M_1$ and the metal atom $M_2$; then (B2) mixing the crystals of the Prussian blue-type metal complex and a solution of a water-soluble ligand L dissolved into a solvent containing water or an alcohol, to obtain a dispersion liquid containing superfine particles of the Prussian blue-type metal complex; and (C) removing the solvent from the dispersion liquid, to obtain solid-powder-shaped superfine particles of the Prussian blue-type metal complex in which the particles have an average particle diameter of 50 nm or less.

In the method of producing superfine particles of a Prussian blue-type metal complex, the metal atom $M_1$ can be at least one selected from the group consisting of vanadium, chromium, molybdenum, tungsten, manganese, iron, ruthenium, cobalt, nickel, platinum, and copper; the metal atom $M_2$ can be at least one selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium; and the ligand L is one or more selected from the compounds represented by formulae (1) to (3):

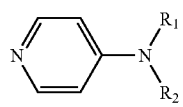

formula (1)

wherein, in the formula, $R_1$ and $R_2$ each independently represent a hydrogen atom or an alkyl group having 8 or more carbon atoms, and either of these groups may be introduced with an unsaturated bond;

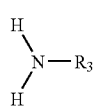

formula (2)

wherein, in the formula, $R_3$ represents an alkyl group having 8 or more carbon atoms, and this group may be introduced with an unsaturated bond; and

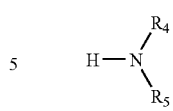

formula (3)

wherein, in the formula, $R_4$ represents an alkyl group having 6 or more carbon atoms, $R_5$ represents an alkyl group, and either of these groups may be introduced with an unsaturated bond.

In the method of producing superfine particles of a Prussian blue-type metal complex, the metal atom $M_1$ or $M_2$ can include two or more kinds of metal atoms, and a mixing amount of the two or more kinds of metal ions is adjusted to obtain the superfine particles of the Prussian blue-type metal complex in a prescribed metal composition.

The method of producing superfine particles can further include adding an agent for adjusting an optical property while (A) the crystals of the Prussian blue-type metal complex are precipitated and/or (B) the dispersion liquid of the superfine particles is obtained.

Another method of producing a dispersion liquid of superfine particles of a Prussian blue-type metal complex includes the following steps (A) and (B):

(A) mixing an aqueous solution that comprises an anionic cyano-metal-complex having a metal atom $M_1$ as a central metal and an aqueous solution that comprises a metal cation of a metal atom $M_2$, to precipitate crystals of a Prussian blue-type metal complex including the metal atom $M_1$ and the metal atom $M_2$, and then (B) mixing the crystals of the Prussian blue-type metal complex and a solution of a ligand L dissolved into a solvent, to obtain a dispersion liquid containing superfine particles of the Prussian blue-type metal complex, in which the particles are in a nanometer size.

Superfine particles of a Prussian blue-type metal complex can include a crystal of a Prussian blue-type metal complex including a metal atom $M_1$ and a metal atom $M_2$, in which the metal atom $M_1$ is at least one selected from the group consisting of vanadium, chromium, molybdenum, tungsten, manganese, iron, ruthenium, cobalt, nickel, platinum, and copper; and the metal atom $M_2$ is at least one selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium; and a ligand L is one or more selected from compounds represented by formulae (1) to (3):

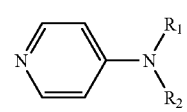

formula (1)

wherein, in the formula, $R_1$ and $R_2$ each independently represent a hydrogen atom or an alkenyl group having 8 or more carbon atoms,

formula (2)

wherein, in the formula, $R_3$ represents an alkenyl group having 8 or more carbon atoms, and

formula (3)

wherein, in the formula, $R_4$ represents an alkyl group having 6 or more carbon atoms, and $R_5$ represents an alkyl group or an alkenyl group;

wherein the ligand L coordinates to the crystal for being superfine particles in an average particle diameter of 50 nm or less.

By the method to synthesize the superfine particle of the Prussian blue-type complexes and their solution in the present invention, it is possible to synthesize the superfine particles of the Prussian blue-type complexes, dispersing in solutions stably, easily and massively. Furthermore, it is possible to synthesize efficiently the superfine particles of the Prussian blue-type complexes with high purity without expensive a large amount of the expensive solvents. The superfine particles of the Prussian blue-type complexes have a high stability in the various solvents without precipitates, indicating that the superfine-particles suits industrial productions in the various field.

4. BRIEF DESCRIPTION OF THE DRAWINGS

5. DETAILED DESCRIPTION OF PREFERRED EMBODIMENTS

Figure 1:
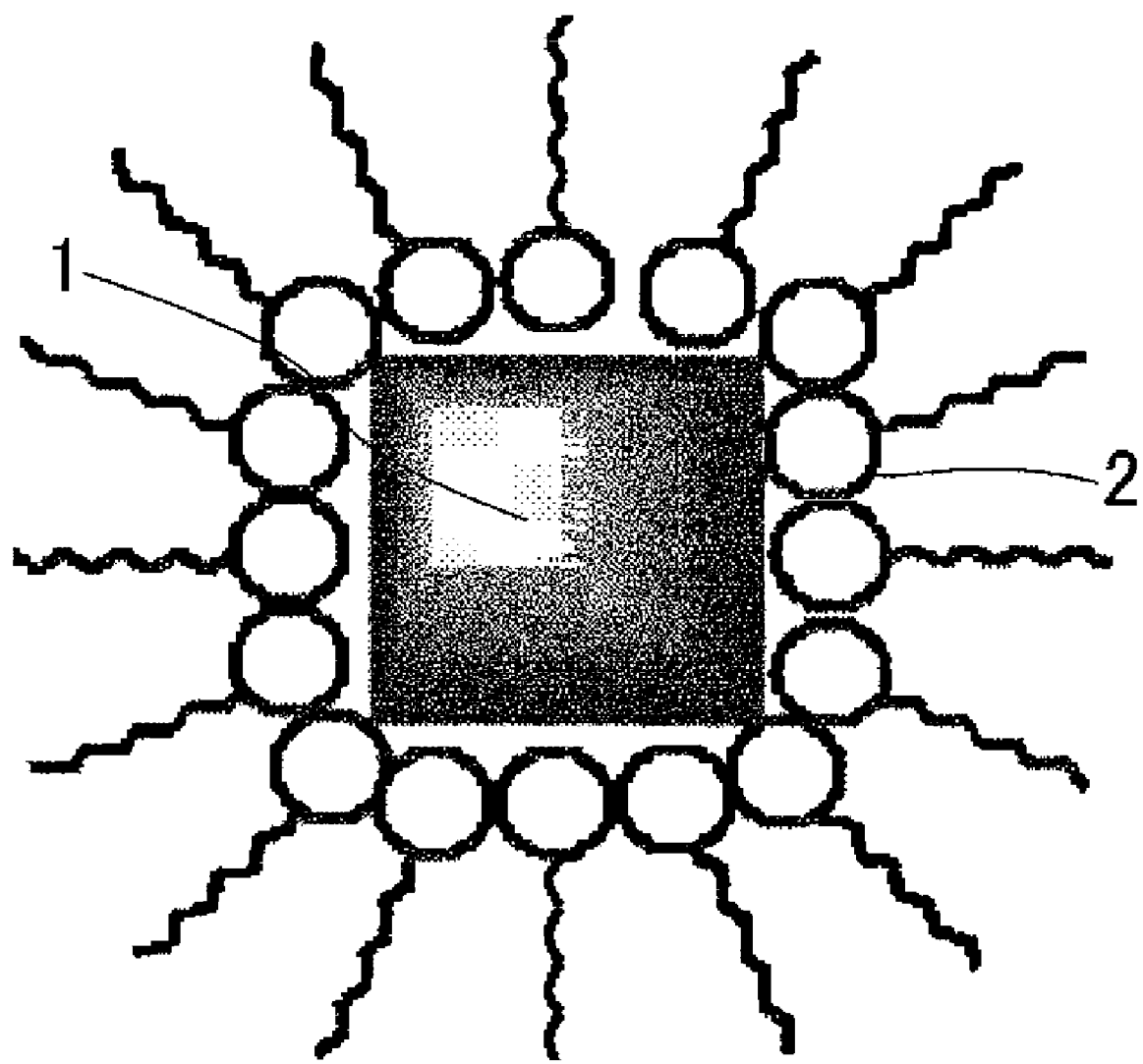
FIG. 1 shows schematic structural illustration of the nanoparticle of Prussian blue-type complex.

Hereafter, the superfine particles of the Prussian blue-type complexes and their fabrication method in the present invention will be explained in detail.

In the fabrication method of the superfine particles of the Prussian blue-type complexes in the present invention, the aqueous solution including the metal-cyanide anions with the centered metal atom M1 and the aqueous solution including cations of the metal M2 are used. For the metal atoms M1, Vanadium (V), Chromium (Cr), Molybdenum (Mo), Tungsten (W), Manganese (Mn), Iron (Fe), Ruthenium (Ru), Cobalt (Co), Nickel (Ni), Platinum (Pt), Copper (Cu) are available, for example. For the metal atoms M2, Vanadium (V), Chromium (Cr), Manganese (Mn), Iron (Fe), Ruthenium (Ru), Cobalt (Co), Rhodium (Rh), Nickel (Ni), Palladium (Pd), Platinum (Pt), Copper (Cu), Silver (Ag), Zinc (Zn), Lanthanum (La), Europium (Eu), Gadolinium (Gd), Lutetium (lu), Barium (Ba), Strontium (Sr), Calcium (Ca) are available, for example. For the metal atom M1, Iron, Chromium and Cobalt are more preferred, and Iron is particularly preferred. For the metal atom M2, Iron, Cobalt, Nickel, Vanadium, Copper, Manganese, Zinc are more preferred, and Iron, Cobalt, Nickel are particularly preferred.

The counter cation of the metal-cyanide anions with the centered metal atom M1 in the aqueous solution is not limited. For example, Potassium ion, ammonium ion, and Sodium ion are used. The counter ion of the cation of the metal atom M2 is not limited. For example, $NO_3^-$ and $SO_4^{2-}$ are used.

For the metal atom M1 and M2, combination of the two or more kinds of atoms can be used. In the case of the combination of the two kinds of atoms, for the metal atom M1, the combination of Iron and Chromium, the combination of Iron and Cobalt, the combination of Chromium and the Cobalt are preferred, and the combination of the Iron and Chromium is particularly preferred. For the metal atoms M2, the combination of Iron and Nickel, the combination of Iron and cobalt, and Nickel and Cobalt is preferred, and the combination of Iron and nickel is particularly preferred. By tuning the composition ratio of the combination of the metal atoms, the property of the superfine particles of the Prussian blue-type complexes can be controlled; especially the optical properties are controlled.

In the fabrication method of the superfine particles of the Prussian blue-type complexes in the present invention, a solution with ligand L dissolved into solvents is used. It is preferred that the kind of solution is determined by the combination with the ligand L. In the case that an organic solvent is used as the solvent, toluene, dichloromethane, chloroform, hexane, ether are preferred.

When ligands dissolved into water such as 2-amino-ethenol is used for the ligand L, water can be used as the solvents. Then the Prussian blue-type complexes that are dispersed into water can be obtained. In this case, alcohol is also preferred to use for the solvents.

In the present invention, dispersion solution of the superfine particles of the Prussian blue-type complexes is produced by the procedure including the process (A) and the process (B) described after. The superfine particles are obtained by the procedure including the process (A), the process (B), and the process (C) described after. In the case of the fabrication of the superfine-particles dispersing into organic solvents, the process (B1) is used as the process (B). In the case of the fabrication of the superfine-particles dispersing into water solvents, the process (B2) is used as the process (B). Each procedure will be explained in the following.

In the process (A), the water solution including metal-cyanide anions with the center metal atom M1 and the water solution including metal cation M2 is mixed, resulting the precipitation of crystal of the Prussian blue-type complexes consisting of the metal atom M1 and M2, where mixture ratio of the metal-cyanide anions M1 and metal cation M2 is not confined. But it is preferred to set molar ratio M1:M2=1:1-1:1.5.

The process (B), the solution of the ligand L dissolved into a solvent and the crystal of the Prussian blue-type complexes obtained the process (A) are mixed. Amount of the solvent is not limited. But mass ratio "the ligand L:the solution" is preferred to 1:5-1:50. The mixing process with stirring is preferable, and then the dispersion solution of the superfine particles in the solvent is obtained.

Amount of the ligand L is preferred to determine to from the relation M1+M1:L=1:0.2-1:2 in the molar ratio.

The process (B1), the solution of the ligand L dissolved into a organic solvent and the crystal of the Prussian blue-type complexes obtained the process (A) is mixed. In order to accelerate the production speed of the superfine particles of the Prussian blue-type complexes, addition of the water in this process is preferred. Amount of the water is preferred to determine with the relation that "solution: water" should be 1:0.01-1.0.1 in the mass ratio.

The process (B2) is the solution of the water-soluble ligand L dissolved into a water or alcohol and the crystal of the Prussian blue-type complexes obtained the process (A) are mixed, where as the alcohol, lower alcohol such as methanol, ethanol, and propanol is preferred.

By adding water to solid material obtained after the separation of the alcohol, water dispersion solution of the superfine particle of the Prussian blue-type complexes. The water solution of the superfine particle of the Prussian blue-type complexes is also obtained by the stirring of the mixture of the water solution of the ligand L and the crystal of the Prussian blue-type complexes obtained in the process (A). In the view of the stability of the dispersion solution and improvement of the yield of the production, using alcohol is more preferred.

In the process (C), the Prussian blue-type complexes are separated from the solvents. For example, when the superfine particles of the Prussian blue-type complexes are dispersed in a solvent, the separation is achieved by the removal of the solution with pressure reduction. When the superfine particle is not dispersed, the separation can be achieved by the filtration or centrifugation. In the case of using the process (B1), the superfine particle is obtained as the solid powder by the separation of the organic solvent. In the case of using the process (B2), the superfine particle that can be dispersed into water is obtained as the solid powder by the separation of the solvents consisting of the water or the alcohol.

In the fabrication method of the superfine particle of the Prussian blue-type complexes in the present invention, other addition agent can be added. By the function of the addition agent, the different properties can be added to the superfine particles of the Prussian blue-type complexes. For example, the optical properties of the superfine particles of the Prussian blue-type complexes can be controlled by the addition of the ammonia, pyridine, or their mixture. The optical properties can be controlled by the amount of the addition agent. The addition agent is preferred to add in the process (A). The amount of the addition agent is not limited, but molar ratio of the addition agent is 10-200% against the metal atom M2 is preferred.

Furthermore, as the metal atom M1 and M2, the combination of the two or more kinds of metals can be used. By tuning the combination ratio, the properties of the superfine particles of the Prussian blue-type complexes can be controlled. For example, for the fabrication of the $(Fe_{1-x})_3[Fe(CN)_6]_2$ with the combination of the Iron and the nickel for M2, the properties of the superfine particle is controlled by changing x. The superfine particles of the Prussian blue-type complexes with the required composition ratio can be obtained by the tuning the mixing ratio of the ingredient in the process (A).

On the synthetic procedures of this invention, a ligand L is used with dissolved form in a solvent. In the case of an organic solvent such as toluene, it is desirable that the solvent has long-chain alkyl groups. It is also desirable to use single or plural kinds of ligands, which have pyridyl or amino groups, exhibiting the following formulae (1)-(3), as binding sites with superfine particles.

<Chem7>

In the chemical formula (1), $R_1$ and $R_2$ represent hydrogen atoms or the alkyl groups having eight or more carbon chains, independently and respectively. Structure of the alkyl groups is not limited. However, it is preferred that the number of carbon is from eight to twelve. In the case of the $R_1$ or $R_2$ being alkyl groups, it is possible that the alkyl group contains carbon-carbon unsaturated bonds. It is preferred to contain one unsaturated bond at least, and there is no upper limit, however two or less is preferred. Using the ligand L having alkenyl groups which contains carbon-carbon unsaturated bonds, it is possible to improve the dispersibility of nanoparticles in conventional solvents, even in the case that the nanoparticles with the ligands not having the alkenyl groups are difficult to disperse in the conventional solvents except for several polar ones (not including methanol and acetone which is possible to pull out ligands. One of the proper examples is chloroform.). Specifically, it is possible to disperse the nanoparticles in non-polar solvents (for example, hexane) using the ligand having unsaturated bonds, if the solvent does not pull out the ligand from nanoparticles. It is also true of the case of $R_3$ and $R_4$.

In the compounds represented as chemical formula (1), 4-di-octadecylaminopyridine and 4-octadecylaminopyridine, etc. are preferred compounds.

<Chem8>

In the chemical formula (2), R3 represents the alkyl group having eight or more carbon chains. Although there is no limit about the number of carbons, it is preferred to be from eight to twelve. It is possible that the R3 has the carbon-carbon unsaturated bonds. It is preferred to contain one unsaturated bond at least, and there is no upper limit, however two or less is preferred. In the compounds represented as chemical formula (2), oleylamine and stearylamine, etc. are preferred compounds.

<Chem9>

In the chemical formula (3), R4 represents the alkyl group having six or more carbon chains, and it is desirable to be from twelve to sixteen. R5 represents the alkyl group, and its number of carbon chain is desirable to be from one to sixty. It is possible that the R4 and R5 have carbon-carbon unsaturated bonds. It is preferred for R4 and R5 to have one unsaturated bond at least, and there is no upper limit, however two or less is desirable.

In addition, compounds represented by the chemical formula (1), (2), or (3) is possible to have substituents, unless the effect of this invention is obstructed.

The superfine particle of the Prussian blue type-complexes in the present invention is possible to be dispersed in various kinds of solvents (for example organic solvents and water), and possible to prepare the dispersed solution with desired concentrations. For dispersion, it is also possible to use solvents different from the solvent used for the preparation of the nanoparticle. The superfine particles of the Prussian blue type complexes are also possible to be dispersed in the desired solvents at desired concentration as usage.

Figure 10:
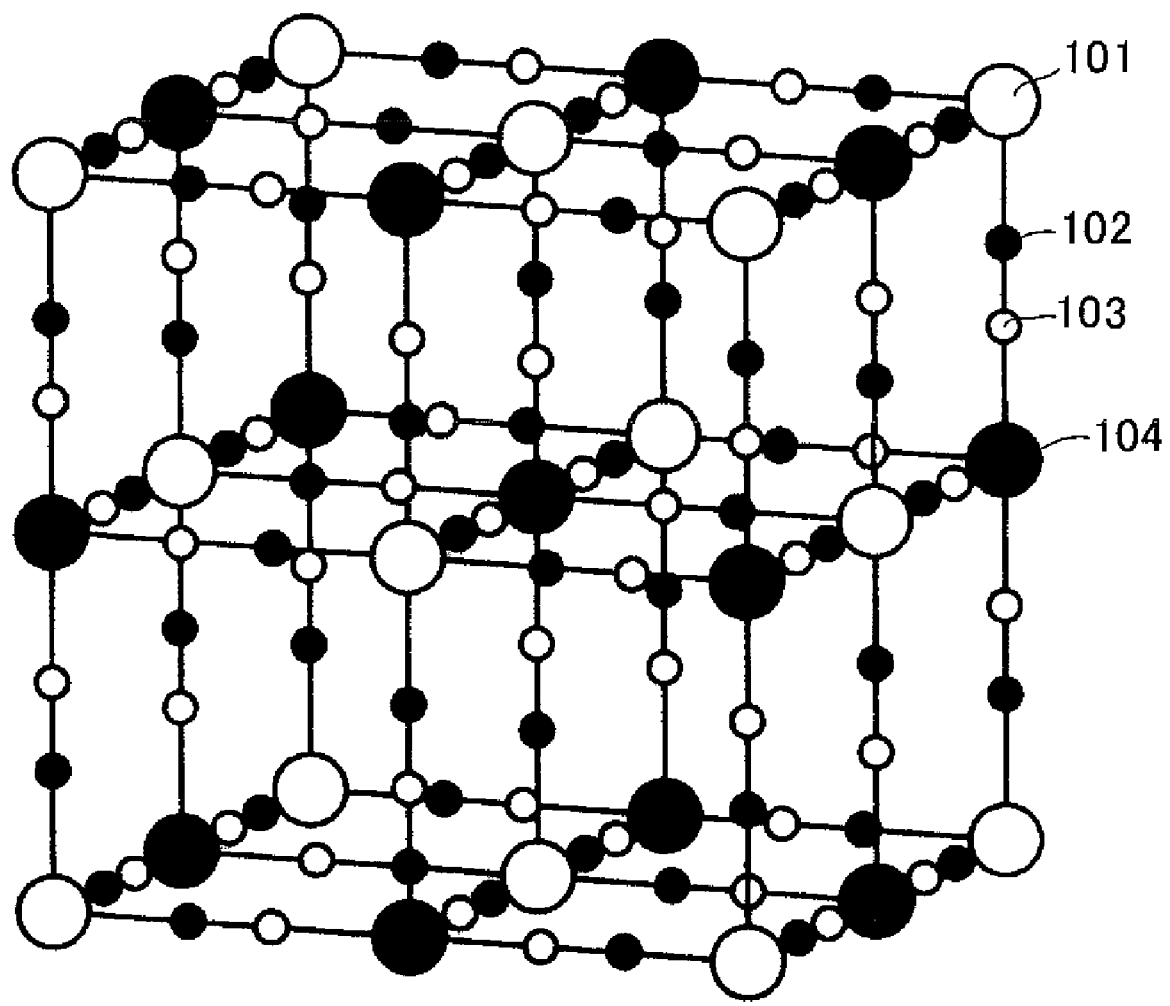
FIG. 10 shows schematic illustration of the crystal structure of Prussian blue type complex.

By the preparation procedure in the present invention, superfine particles of the Prussian blue type complexes with nanometer size can be obtained. FIG. 1 is the schematic illustration exhibiting the structure of a superfine particle of the Prussian blue-type complexes. In this superfine particle, the crystal of the Prussian blue-type complex 1 has the crystal structure shown in FIG. 10, and the ligand L (2) is coordinated on the surface of the crystal of the Prussian blue-type complex 1, herein there is no limit about the amount of ligand L, however, it depends on the size and shape of superfine particles. For example, 5-30% of ligand in molar to the metal atoms (total amount of metal atoms $M_1$ and $M_2$) in the Prussian blue type complex crystal is a preferred proportion.

However, the crystal of the Prussian blue type-complex 1 is possible to have defects or vacancies in its crystal lattice. For example, it is possible that the iron site occupies by vacancy and the cyano-groups coordinated to iron are displaced by water. The control of optical property by modifying the amount and position of vacancy is interesting.

Although there is no limit about the size of the superfine particles of the Prussian blue-type complexes, it is preferable to be minimized in the nanometer order to obtain the nano size effect. The average size of the superfine particles is preferable to be 50 nm or less, furthermore, 20 nm is better considering the improvement of dispersibility in solvents. (In the present invention, the average size means the diameter of superfine particles regarded as sphere, which is estimated from the projection area of particle images measured by TEM, unless it explains specially. The value of the average size is estimated from the average of the measurements of 30 particles, unless it explains specially. The average size of the superfine particles can also be estimated from the full-width at half maximum of a signal in the X-ray diffraction measurement of the nanoparticle powder sample.)

The superfine particles of the Prussian blue-type complex obtained in the present invention shows stable dispersibility in various kinds of solvents (In the present invention, the word "solvent" means "dispersible solvent", not only "dissoluble solvent".), i.e. it can keep the stable dispersing state after several months. By the fabrication of thin films, the superfine particles of the Prussian blue-type complex are possible to use in various applications, e.g. the display, biosensor, photocromic devices and electrochromic ones. (From this point of view, the substances reported in the nonpatent literature I are prepared by the reversed micelle technique, in which the available solvents are limited and the property such as optics does not be clarified.)

By the fabrication method in the present invention, it is possible to prepare the superfine particle of the Prussian blue-type complexes with controlling the optical property, that is, possible to prepare various color materials by tuning its delicate color tone. In the case of non-luminous display devices, they can be used as the color materials corresponding to cyan, yellow, and magenta, and in the case of luminous display devices, they can be used as the color materials corresponding to red, green, and blue.

Since the superfine particle of the Prussian blue type complexes obtained by the present invention is possible to apply inexpensive techniques for film fabrication using its dispersion in solvents, it is expected to improve in the cost for the device fabrication. Since the thin film of the superfine particles of the Prussian blue type complexes obtained by the present invention has large interstitial space between particles, it is expected to improve the ionic conductivity, and electrochemical sensitivity and response time. This is because target molecules can easily penetrate into the film. By the fabrication method of the superfine particles of the Prussian blue-type complexes by the present invention, a large scale synthesis, which have been difficult in conventional methods, can be executed in simple process and at low cost.

6. EXAMPLES

Following is examples of the present invention. These examples are intended only to illustrate the present invention, and are not intended to be limiting.

Example 1

Aqueous solutions of $Fe^{III}(NO_3)_3 \cdot 9H_2O$ (1.4 g) and $(NH_4)_4[Fe^{II}(CN)_6]$ (1.0 g) were mixed to yield insoluble Prussian blue superfine crystals of the general formula, $Fe^{III}_4[Fe^{II}(CN)_6]_3 \cdot nH_2O$ which may be the other formula, $(NH_4)_x Fe^{II}_y[Fe^{III}(CN)_6]_x \cdot nH_2O$, contained ammonium ions. The resulting blue powder was centrifuged, washed with water three times and with methanol twice, and dried under reduced pressure.

Figure 2:
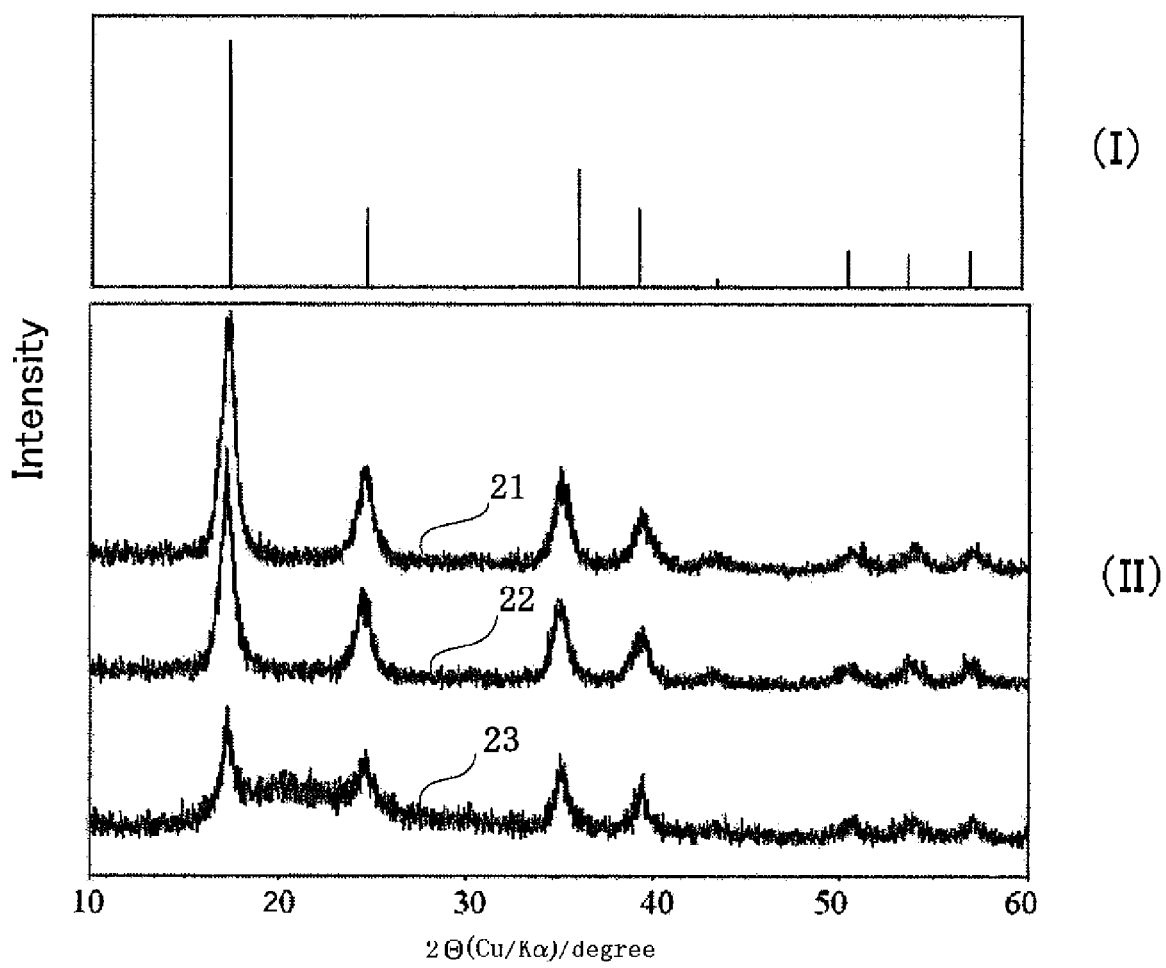
FIG. 2 shows results of powder X-ray diffraction measurement of Prussian blue crystal and its nanoparticle.
Figure 3:
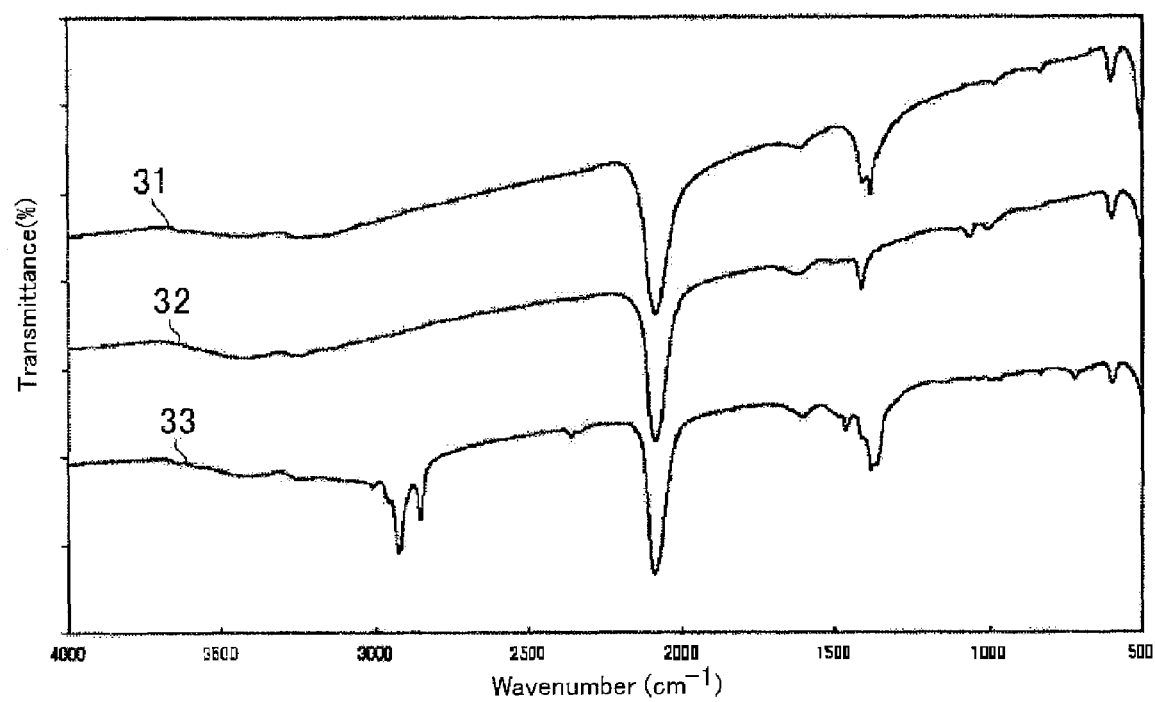
FIG. 3 shows results of FT-IR measurement of Prussian blue crystal and its nanoparticle.

The powder X-ray diffraction (XRD) pattern of the obtained blue powder (FIG. 2(II), curve 21) is consistent with that of the standard sample of Prussian blue on XRD data (FIG. 2(I)). In the FT-IR spectrum of the powder, the specific absorption at 2070 $cm^{-1}$ is ascribable to a CN stretching band of the Fe(II)-CN—Fe(III) coordination bond, as shown in FIG. 3 (curve 31). Based on these results, the obtained blue powder is Prussian blue.

Into a toluene solution (5 ml) of oleylamine (0.17 g) with a long aliphatic chain as the ligand, L, water (0.5 ml) and then the insoluble Prussian blue powder (0.2 g) were added, and the resulting mixture was stirred for 1 day. After the reaction period, the Prussian blue powder could be transferred into the toluene to afford a blue layer. The superfine particles of the Prussian blue are stably dispersed into toluene according to the FT-IR spectrum of the superfine particles of the Prussian blue (FIG. 3, curve 33).

Figure 4:
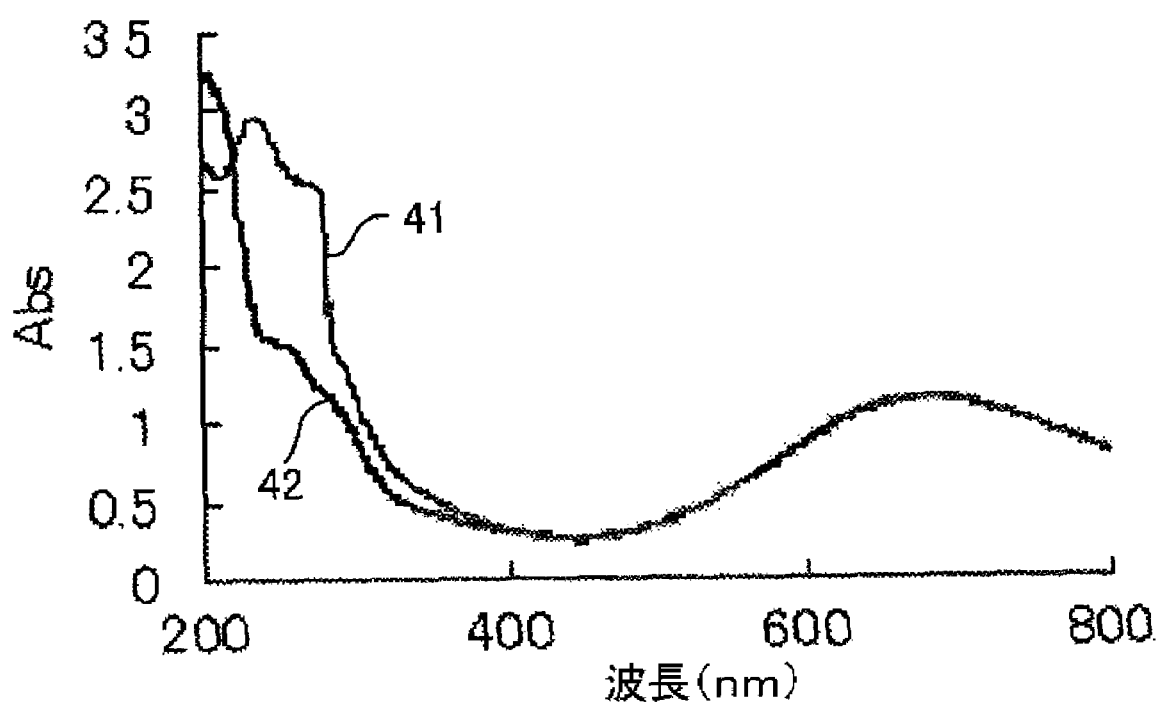
FIG. 4 shows UV-VIS absorption spectra of Prussian blue nanoparticle dispersed in toluene (embodiment 1) and water (embodiment 2).
Figure 5:
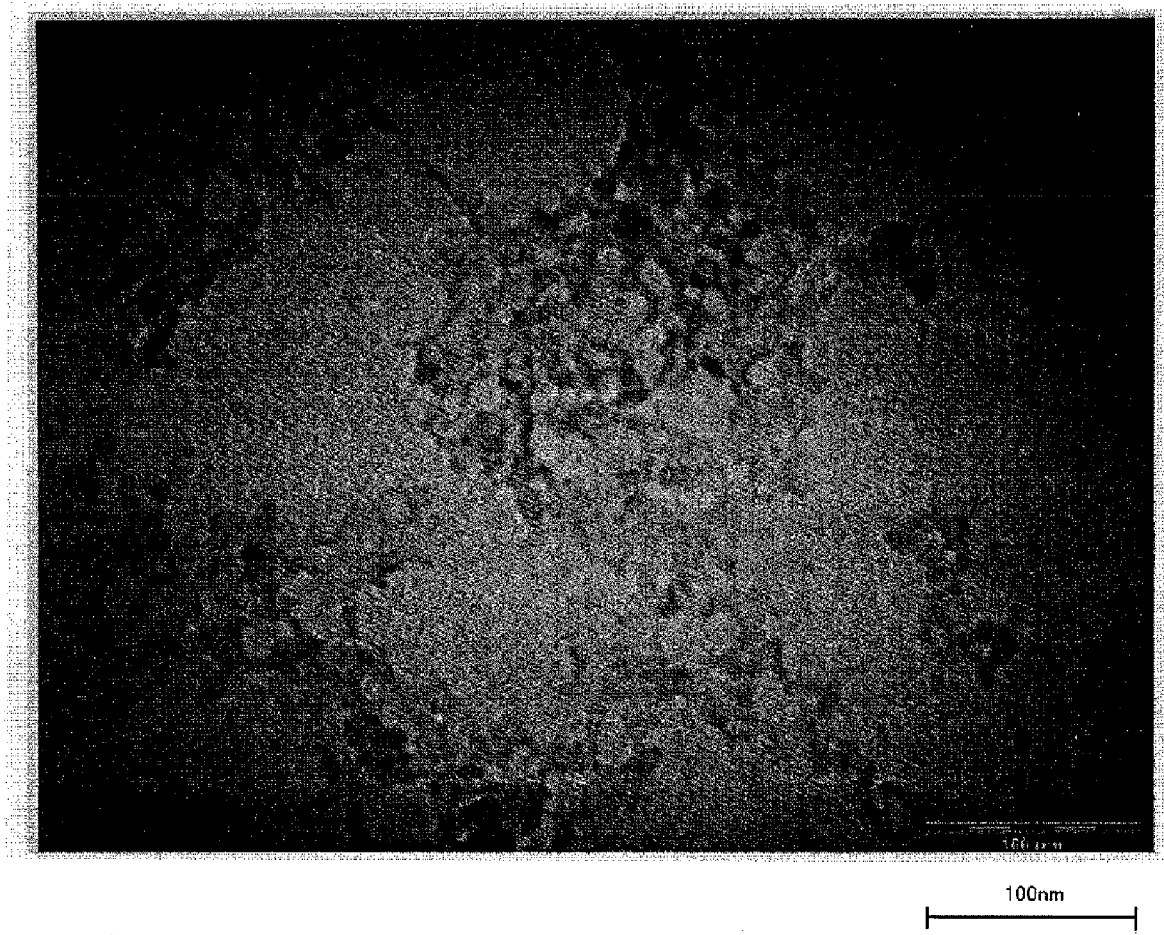
FIG. 5 shows Photo image of TEM of Prussian blue nanoparticle in the dispersed solution (toluene) obtained by the embodiment 1.

After separation of the toluene layer from the reaction mixture, the blue toluene solution was filtered. In the UV-Vis absorption spectrum of the blue filtrate (FIG. 4, curve 41), an intense absorption band around 680 nm originates from a specific charge transfer between the mixed valence Fe(II) and Fe(III) of the Fe—CN—Fe coordination bonds, suggesting that the superfine particles of the Prussian blue are stably dispersed into the toluene layer. The superfine particles of the Prussian blue with the diameter of 10-15 nm in the toluene dispersion solution were confirmed from the transmission electron microscopy (TEM) images (FIG. 5). The insoluble Prussian blue powder can be almost eluted (dispersed) into the toluene layer as the superfine particles without any Prussian blue solid in the water layer.

After evaporation of the toluene dispersion solution of the superfine particles of the Prussian blue to dryness, a solid powder can be quantitatively obtained as the aggregated superfine particles of the Prussian blue. The obtained solid is readily re-dissolved into the usual organic solvents, such as dichloromethane, chloroform, and toluene, to yield deep blue transparent solutions.

The XRD pattern of the solid powder is consistent with that of the standard sample of the Prussian blue on XRD data (FIG. 2(II), curve 23) in peak positions, where an additional broad signal at a lower angle (2θ=20 degree) is due to excess oleylamines.

Example 2

The insoluble PB powder was obtained by the same procedures in the Example 1. Into a solution (5 ml) of 2-aminoethanol (0.040 g) as the ligand, L, the insoluble PB blue powder (0.2 g) was added, and the resulting mixture was stirred for 3 hours to generate the superfine particles of Prussian blue. After the reaction period being stirring, the superfine particles of the Prussian blue were suspended in the methanol solution without their stable dispersion to afford a blue solution. The FT-IR spectrum of the superfine particles of the Prussian blue is shown in FIG. 3 (curve 32).

Figure 6:
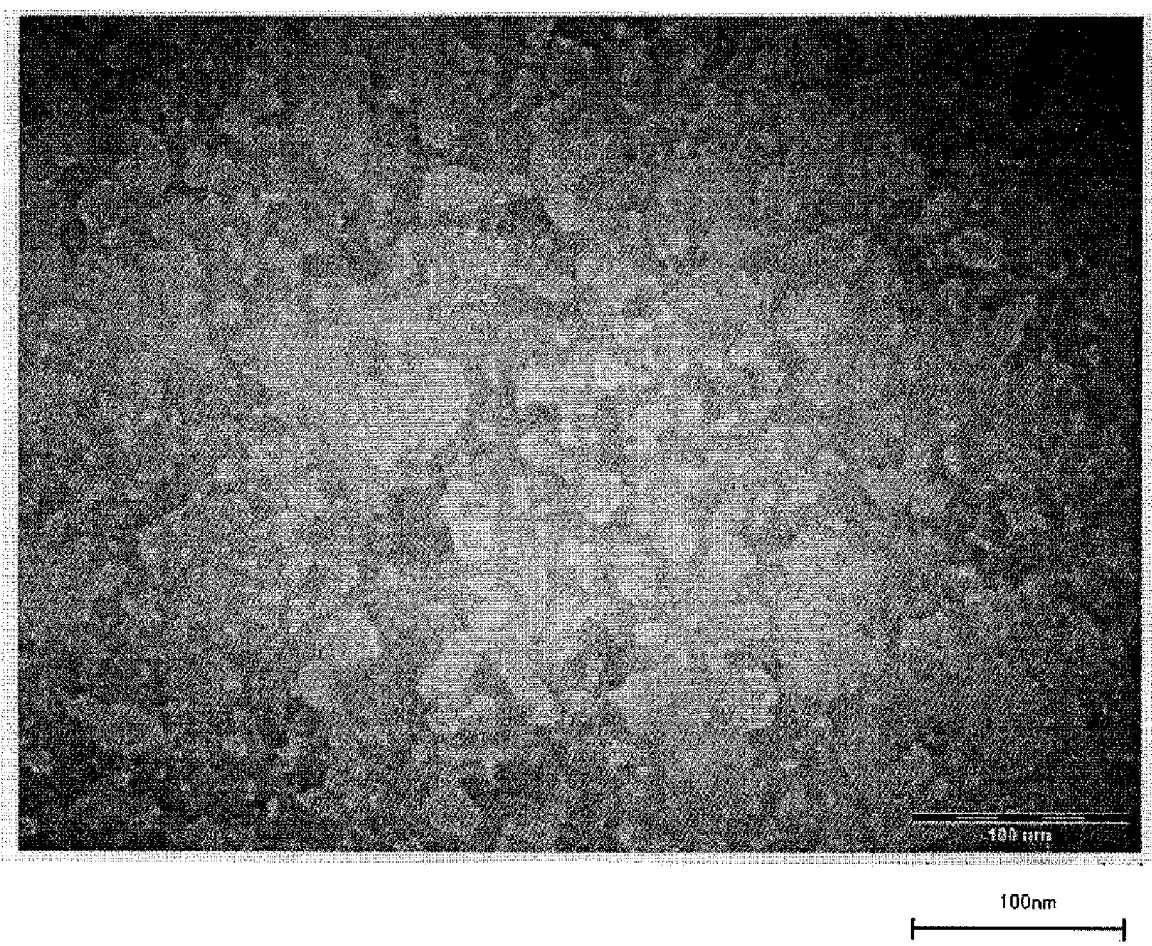
FIG. 6 shows Photo image of TEM of Prussian blue nanoparticle in the water-dispersed solution obtained by the embodiment 2.

By removing the methanol solvent with filtration, the superfine particles of the Prussian blue were separated as a solid blue powder (solid sample α). All of the solid sample α can be dispersed into water to generate a deep blue transparent aqueous solution (solution sample β). The superfine particles of the Prussian blue with the 10-15 nm diameter in the solution sample β were confirmed from the TEM images (FIG. 6). In the UV-Vis absorption spectrum of the solution sample β, an intense absorption band around 680 nm was observed similarly to that of the toluene dispersion solution of the superfine particles of the Prussian blue (FIG. 4, curve 41). Thus, water-dispersible the superfine particles of the Prussian blue and their stable aqueous dispersion solution were obtained by the reaction procedures.

In the XRD pattern of the solid sample α, same signals due to the Prussian blue are detected (FIG. 2 (II), curve 22), and the mean particle size is estimated as 10-20 nm from Scherrer's Law on the basis of the signal broadening. These results reveal that the solid sample α is an aggregated form of the superfine particles of the Prussian blue. The solid sample α is also obtained after evaporation of the solution sample β to dryness.

Example 3

Into a mixture of an aqueous solution (1.5 ml) of $K_3[Fe(CN)_6]$ (0.3289 g, 0.9990 mmol) and a 28% ammonia water (0.1 ml), an aqueous solution (1.0 ml) of $Co(NO_3)_2.6H_2O$ (0.4369 g, 1.501 mmol) was added, and the reaction mixture was stirred for 3 minutes. The resulting insoluble red precipitate was centrifuged, washed with water three times and with methanol once to yield 0.6308 g of a red powder as a Prussian blue (PB) analogue (cobalt hexacyanoferrate), $K_xCo_y[Fe(CN)_6]_x.mNH_3.nH_2O$.

Into a suspension of water (0.5 ml) and the cobalt hexacyanoferrate (0.2040 g (0.3396 mol), a toluene solution (3.0 ml) of oleylamine (0.4433 g (1.657 mmol) was added, and the reaction mixture was stirred for 1 day. Thus, the insoluble cobalt hexacyanoferrate was eluted into the toluene layer as dispersible nanoparticles to yield a solution sample γ

After evaporation of the solution sample γ containing the superfine particles of the cobalt hexacyanoferrate to dryness, a red solid sample was obtained as an aggregated form of the superfine particles of the cobalt hexacyanoferrate.

Figure 8:
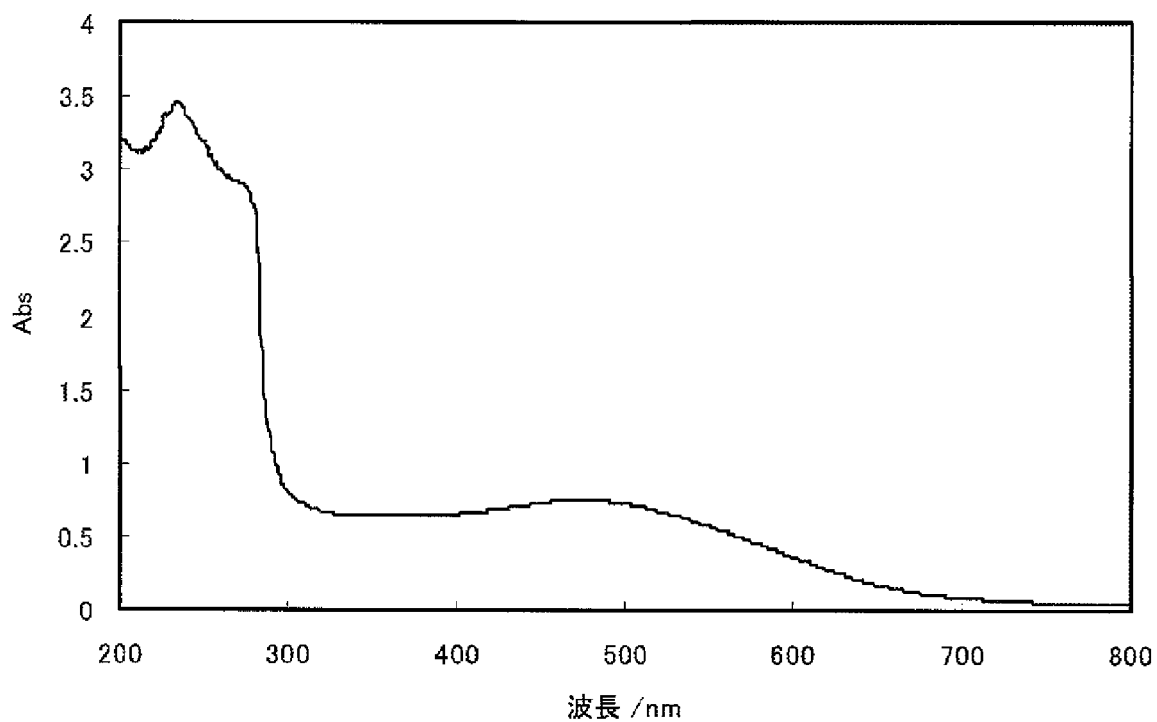
FIG. 8 shows UV-VIS absorption spectra of cobalt-iron-cyano complex nanoparticle in the dispersed solution (toluene) obtained by the embodiment 3.

The UV-Vis absorption spectra of the superfine particles of the cobalt hexacyanoferrate were measured using a diluted solution of the centrifuged deep red toluene layer of the solution sample γ. The dispersed superfine particles of the cobalt hexacyanoferrate in toluene exhibit an intense band at 480 nm (FIG. 8), which is significantly shifted from the absorption maximal wavelength (520 nm) of the cobalt hexacyanoferrate prepared without ammonia water. The solution colors are visually distinguishable: the latter solution without ammonia exhibits a purple color and the former solution with ammonia is rather red.

The optical properties of the superfine particles of the PB analogues can be controlled depending on the additional ligands (coordination molecules), such as ammonia.

Example 4

(Synthesis of $(Fe_{0.2}Ni_{0.8})_3[Fe(CN)_6]_2$)

Into an aqueous solution (2 ml) of $K_3[Fe(CN)_6]$ (0.658 g ($2.00\times10^{-3}$ mol), an aqueous mixture (2.0 ml) of $FeSO_4.7H_2O$ (0.167 g ($6.00\times10^{-4}$ mol) and $Ni(NO_3)_2.6H_2O$ (0.698 g ($2.40\times10^{-3}$ mol) was added with stirring. The resulting insoluble precipitate was centrifuged, washed with water three times and methanol once. The Fe/Ni mixed metal PB analogues, $(Fe_{0.2}Ni_{0.8})_3[Fe(CN)_6]_2.nH_2O$ was obtained as an air-dried solid powder.

(Synthesis of $(Fe_{0.4}Ni_{0.6})_3[Fe(CN)_6]_2$)

Into an aqueous solution (2 ml) of $K_3[Fe(CN)_6]$ (0.658 g ($2.00\times10^{-3}$ mol), an aqueous mixture (2.0 ml) of $FeSO_4.7H_2O$ (0.500 g ($1.80\times10^{-3}$ mat) and $Ni(NO_3)_2.6H_2O$ (0.349 g ($1.20\times10^{-3}$ mol) was added with stirring. The resulting insoluble precipitate was centrifuged, washed with water three times and methanol once. The Fe/Ni mixed metal PB analogues, $(Fe_{0.6}Ni_{0.4})_3[Fe(CN)_6]_2.nH_2O$ was obtained as an air-dried solid powder.

(Synthesis of $(Fe_{0.6}Ni_{0.4})_3[Fe(CN)_6]_2$)

Into an aqueous solution (2 ml) of $K_3[Fe(CN)_6]$ (0.658 g ($2.00\times10^{-3}$ mol), an aqueous mixture (2.0 ml) of $FeSO_4.7H_2O$ (0.500 g ($1.80\times10^{-3}$ mol) and $Ni(NO_3)_2.6H_2O$ (0.349 g ($1.20\times10^{-3}$ mol) was added with stirring. The resulting insoluble precipitate was centrifuged, washed with water three times and methanol once. The Fe/Ni mixed metal PB analogues, $(Fe_{0.6}Ni_{0.4})_3[Fe(CN)_6]_2.nH_2O$ was obtained as an air-dried solid powder.

(Synthesis of $(Fe_{0.8}Ni_{0.2})_3[Fe(CN)_6]_2$)

Into an aqueous solution (2 ml) of $K_3[Fe(CN)_6]$ (0.658 g ($2.00\times10^{-3}$ mol), an aqueous mixture (2.0 ml) of $FeSO_4.7H_2O$ (0.667 g ($2.40\times10^{-3}$ mol) and $Ni(NO_3)_2.6H_2O$ (0.174 g ($5.98\times10^{-4}$ mol) was added with stirring. The resulting insoluble precipitate was centrifuged, washed with water three times and methanol once. The Fe/Ni mixed metal PB analogues, $(Fe_{0.8}Ni_{0.2})_3[Fe(CN)_6]_2.nH_2O$ was obtained as an air-dried solid powder.

A toluene solution (2 ml) of oleylamine (0.090 g, $3.4\times10^{-4}$ mol) and water (0.2 ml) were stirred for 1 day with four kinds of the Fe/Ni mixed Prussian blue-type complexes, $(Fe_{1-x}Ni_x)_3[Fe(CN)_6]_2.nH_2O$, respectively. After the reaction period, the superfine particles of the Fe/Ni mixed Prussian blue-type complexes were dispersed into the toluene layer.

Figure 9:
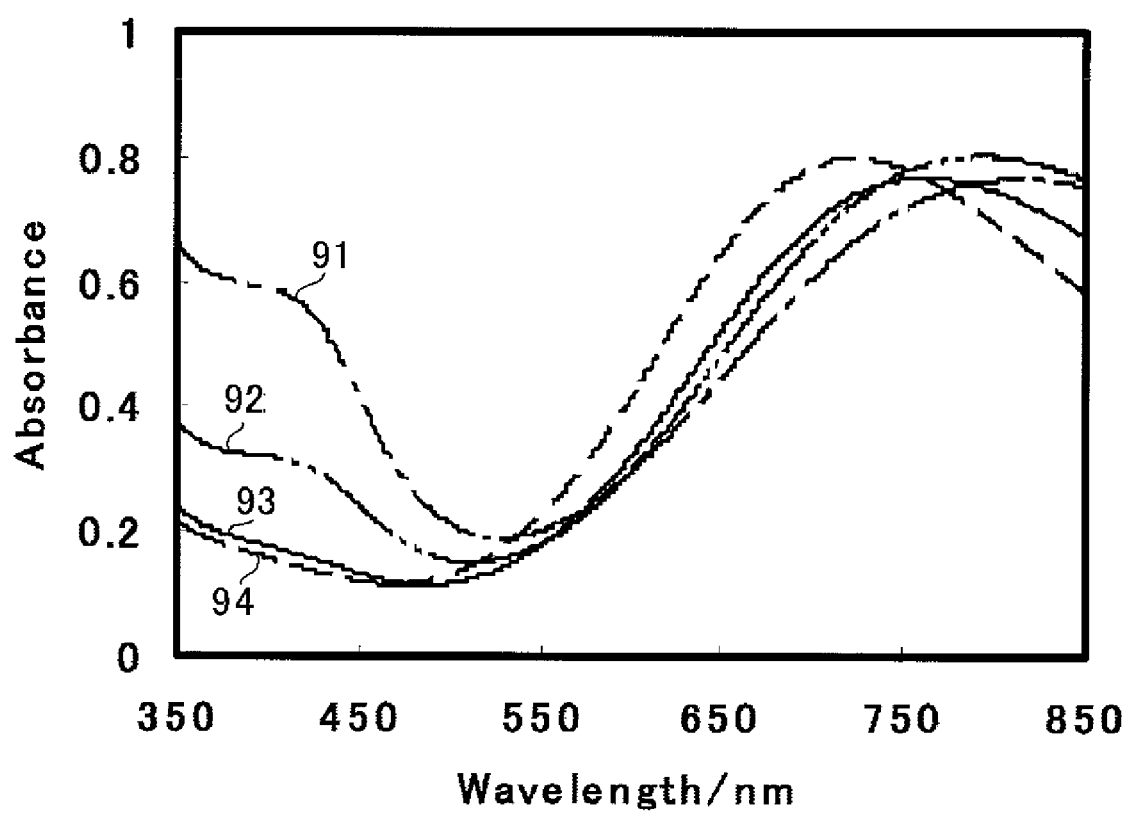
FIG. 9 shows UV-VIS absorption spectra changing the composition of metal $M_2$ (iron-nickel).

The centrifuged toluene layer (upper layer) was separated from the reaction mixture. The UV-Vis absorption spectra of $(Fe_{I-x}Ni_x)_3[Fe(CN)_6]_2.nH_2O$ stably dispersed in the toluene layer as superfine particles are shown in FIG. 9: Curves 91, 92, 93, and 94 correspond to the spectra of x=0.8, 0.6, 0.4, and 0.2, respectively.

Based on the UV-Vis absorption spectra of $(Fe_{I-x}Ni_x)_3[Fe(CN)_6]_2.nH_2O$, absorption maxima due to the charge transfer (CT) between the mixed valence Fe(II) and Fe(III) are systematically sifted to longer wavelength, as the nickel content (x) increases. The absorption band around 400 nm derived from the Fe—CN—Ni coordination bond also intensifies, as the nickel content (x) increases. These spectroscopic results indicate that two metal ions of Ni and Fe are homogeneously distributed in each nanoparticle of $(Fe_{1-x}Ni_x)_3[Fe(CN)_6]_2 \cdot nH_2O$. If the different metal ions of Ni and Fe are localized in each superfine particles, or the superfine particles of two formula, such as $Ni_3[Fe(CN)_6]_2$ and $Fe_4[Fe(CN)_6]_3$ are simply mixed, the systematic shift of the absorption maximal wavelengths due to CT can not be observed depending on the nickel content (x).

Example 5

As the metal atoms, $M_1$ and $M_2$, the ligands L, and the solvents are listed in Table 1, samples 1-16 and 17-16 have been prepared by similar procedures to those of the Examples 1 and 2, respectively to generate the superfine particles of the Prussian blue-type complexes. In the Table 1, samples 20 and 21 are the superfine particles of the Prussian blue-type complexes prepared in Examples 3 and 4, respectively. A variety of the superfine particles of the Prussian blue-type complexes can be obtained by similar production methods.

TABLE 1

|    | M1 | M2    | L                         | solvent         | Addition agent |
|----|----|-------|---------------------------|-----------------|----------------|
| 1  | Fe | Fe    | oleylamine                | toluene         | —              |
| 2  | Fe | Fe    | oleylamine                | dichloromethane | —              |
| 3  | Fe | Fe    | oleylamine                | chloroform      | —              |
| 4  | Fe | Fe    | oleylamine                | hexane          | —              |
| 5  | Fe | Fe    | oleylamine                | diethyl ether   | —              |
| 6  | Fe | Fe    | stearylamine              | toluene         | —              |
| 7  | Fe | Fe    | stearylamine              | dichloromethane | —              |
| 8  | Fe | Fe    | stearylamine              | chloroform      | —              |
| 9  | Fe | Fe    | 4-di-octadecylamino pyridine | toluene      | —              |
| 10 | Fe | Fe    | 4-di-octadecylamino pyridine | dichloromethane | —           |
| 11 | Fe | Fe    | 4-di-octadecylamino pyridine | chloroform   | —              |
| 12 | Fe | Fe    | 4-octadecylamino pyridine | toluene         | —              |
| 13 | Fe | Co    | oleylamine                | toluene         | —              |
| 14 | Fe | Co    | stearylamine              | toluene         | —              |
| 15 | Fe | Co    | 4-di-octadecylamino pyridine | toluene      | —              |
| 16 | Fe | Ni    | oleylamine                | toluene         | —              |
| 17 | Fe | Fe    | 2-aminoethanol            | water           | —              |
| 18 | Fe | Co    | 2-aminoethanol            | water           | —              |
| 19 | Fe | Fe    | 2-(2-amino-ethoxy)ethanol | water           | —              |
| 20 | Fe | Co    | oleylamine                | toluene         | ammonia        |
| 21 | Fe | Fe, Ni| oleylamine                | toluene         | —              |

Through all experimental examples to prepare the samples 1-21 in the Table 1, the crystals of Prussian blue-type complexes prepared in the process (A) were almost transformed into the corresponding superfine particles of the Prussian blue-type complexes. Preparation of the crystal of the Prussian blue-type complexes using just enough metal precursors leads to a quantitative yield of the corresponding superfine particles.

Figure 7:
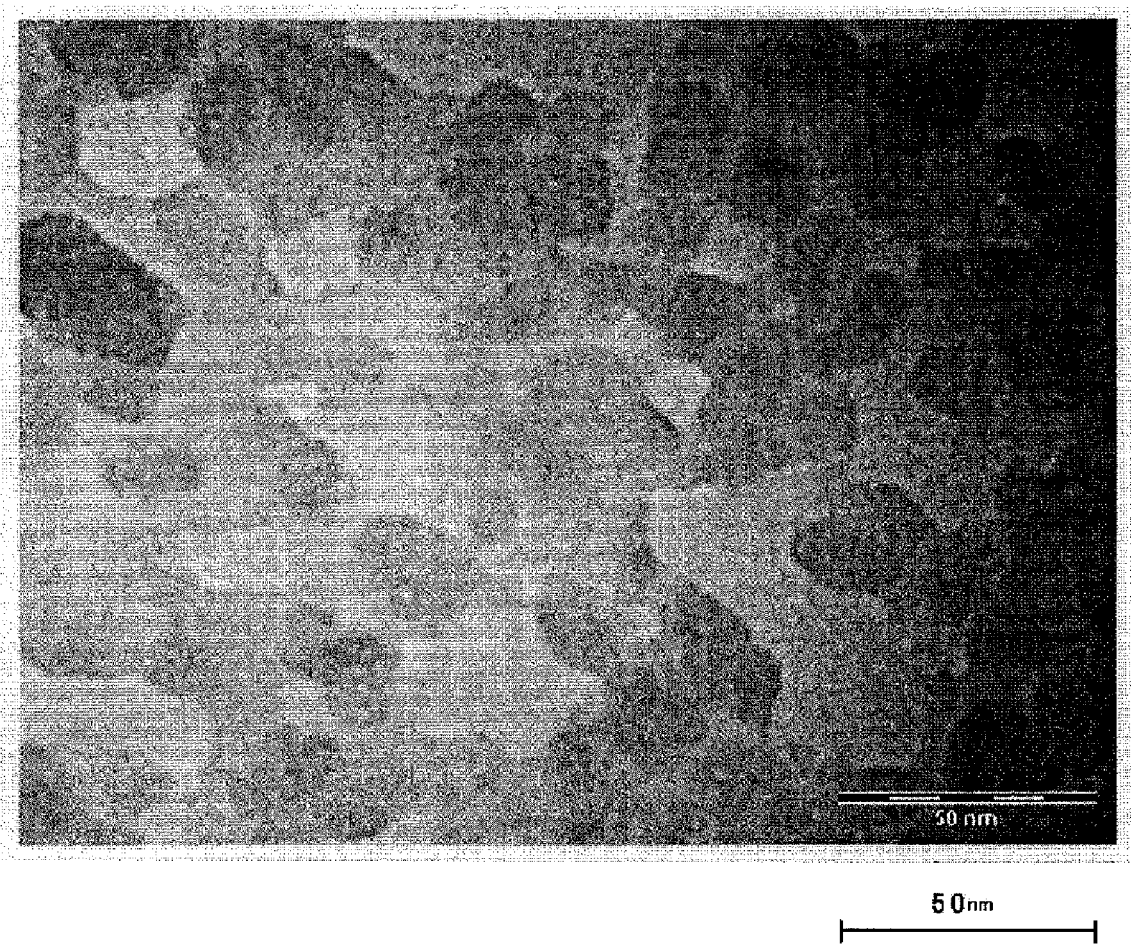
FIG. 7 shows Photo image of TEM of cobalt-iron-cyano complex nanoparticle dispersed in the organic solvent obtained by the embodiment 6.

In the fabrication procedure of the crystals of the Prussian blue-type complexes, shown in process (A), other precursors are available. From an aqueous mixture of $K_3[Fe^{III}(CN)_6]$ (1.0 g) and $Fe^{II}SO_4 \cdot 7H_2O$ (0.84 g), or $Na_4[Fe^{II}(CN)_6] \cdot 10H_2O$ (1.0 g) and $Fe^{III}(NO_3)_3 \cdot 9H_2O$ (0.83 g), an insoluble Prussian blue-type complexes are isolated, which can be isolated into stably dispersed superfine particles of the Prussian blue in solvents through a similar synthetic process. As already mentioned, the metals, $M_1$ and $M_2$, are not limited to Fe. The superfine particles of the cobalt hexacyanoferrate has been prepared using $[Fe(CN)_6]^{3-}$ and $Co^{2+}$, as the TEM image of the superfine particles is shown in FIG. 7.

The Prussian blue-type complexes are possible to use for application in the wide purpose using their electrochemical characters, e.g. display, photochromic devices, biosensor, and electrochromic devices.

By the preparation technique in this invention, it is possible to prepare the Prussian blue type complex fine particle controlling the optical property, that is, possible to prepare various color materials by tuning its delicate color tone. In the case of non-luminous display devices, they can be used as the color materials corresponding to cyan, yellow, and magenta, and in the case of luminous display devices, they can be used as the color materials corresponding to R, G, and B.

The ultrafine particles in the present invention is used for the fabrication of the devices such as electrochemical ones by the coating with their dispersion solution, such as spin-coating.

The specific examples recited above the intended only to illustrate the invention and its practical application, and are not intended to be limiting. Many modifications still in keeping within the scope and spirit of the invention will be apparent to one skilled in the art upon reading this description.

The invention claimed is:

1. A method of producing superfine particles of a Prussian-blue-structure metal complex, comprising:
   (A) mixing an aqueous solution that comprises an anionic cyano-metal-complex having a metal atom $M_1$ as a central metal and an aqueous solution that comprises a metal cation of a metal atom $M_2$, to precipitate crystals of a Prussian-blue-structure metal complex comprising the metal atom $M_1$ and the metal atom $M_2$; then
   (B) mixing the crystals of the Prussian-blue-structure metal complex and a solution of a ligand L dissolved into a solvent, to obtain a dispersion liquid containing superfine particles of the Prussian-blue-structure metal complex; and
   (C) separating the Prussian-blue-structure metal complex from the dispersion liquid for forming the superfine particles,
   wherein the ligand L is one or more amino-groups.

2. The method of producing superfine particles of a Prussian-blue-structure metal complex according to claim 1, comprising:
   (A) mixing an aqueous solution that comprises an anionic cyano-metal-complex having a metal atom $M_1$ as a central metal and an aqueous solution that comprises a metal cation of a metal atom $M_2$, to precipitate crystals of a Prussian-blue-structure metal complex comprising the metal atom $M_1$ and the metal atom $M_2$; then
   (B2) mixing the crystals of the Prussian-blue-structure metal complex and a solution of a water-soluble ligand L dissolved into a solvent containing water or an alcohol, to obtain a dispersion liquid containing superfine particles of the Prussian-blue-structure metal complex; and
   (C) removing the solvent from the dispersion liquid, to obtain solid superfine particles of the Prussian-blue-structure metal complex in which said particles have an average particle diameter of 50 nm or less.

3. The method of producing superfine particles of a Prussian-blue-structure metal complex, comprising:
   (A) mixing an aqueous solution that comprises an anionic cyano-metal-complex having a metal atom $M_1$ as a central metal and an aqueous solution that comprises a metal cation of a metal atom $M_2$, to precipitate crystals of a Prussian-blue-structure metal complex comprising the metal atom $M_1$ and the metal atom $M_2$; then (B1) mixing the crystals of the Prussian-blue-structure metal complex and a solution of a ligand L dissolved into a solvent, to obtain a dispersion liquid containing superfine particles of the Prussian-blue-structure metal complex; and (C) separating the Prussian-blue-structure metal complex from the dispersion liquid for forming the superfine particles, wherein the ligand L is one or more pyridine-groups.

4. The method of producing superfine particles of a Prussian-blue-structure metal complex according to claim 3, wherein the solution of the ligand L, dissolved in the organic solvent, contains water.

5. The method of producing superfine particles of a Prussian-blue-structure metal complex according to any one of claims 1 to 2, wherein the metal atom $M_1$ is at least one selected from the group consisting of vanadium, chromium, molybdenum, tungsten, manganese, iron, ruthenium, cobalt, nickel, platinum, and copper; the metal atom $M_2$ is at least one selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium; and the ligand L is one kind, two kinds, or more kinds of compounds represented by foumulae (1) to (3):

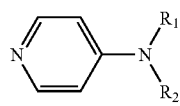

formula (1)

wherein, in the formula, $R_1$ and $R_2$ each independently represent a hydrogen atom or an alkyl group having 8 or more carbon atoms, and either of these groups may be introduced with an unsaturated bond;

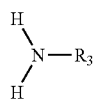

formula (2)

wherein, in the formula, $R_3$ represents an alkyl group having 8 or more carbon atoms, and this group may be introduced with an unsaturated bond; and

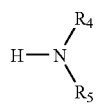

formula (3)

wherein, in the formula, $R_4$ represents an alkyl group having 6 or more carbon atoms, $R_5$ represents an alkyl group, and either of these groups may be introduced with an unsaturated bond.

6. The method of producing superfine particles of a Prussian-blue-structure metal complex according to any one of claims 1 to 2, wherein the metal atom $M_1$ or $M_2$ comprises two or more kinds of metal atoms, and a mixing amount of said two or more kinds of metal ions is adjusted to obtain the superfine particles of the Prussian-blue-structure metal complex in a metal composition to be obtained.

7. The method of producing superfine particles of a Prussian-blue-structure metal complex according to any one of claims 1 to 2, further comprising adding an agent for adjusting an optical property while (A) the crystals of the Prussian-blue-structure metal complex are precipitated and/or (B) the dispersion liquid of the superfine particles is obtained.

8. A method of producing a dispersion liquid of superfine particles of a Prussian-blue-structure metal complex, comprising:

(A) mixing an aqueous solution that comprises an anionic cyano-metal-complex having a metal atom $M_1$ as a central metal and an aqueous solution that comprises a metal cation of a metal atom $M_2$, to precipitate crystals of a Prussian-blue-structure metal complex comprising the metal atom $M_1$ and the metal atom $M_2$, and then (B) mixing the crystals of the Prussian-blue-structure metal complex and a solution of a ligand L dissolved into a solvent, to obtain a dispersion liquid containing superfine particles of the Prussian-blue-structure metal complex.

9. Superfine particles of a Prussian-blue-structure metal complex, comprising:

a crystal of a Prussian-blue-structure metal complex comprising a metal atom $M_1$ and a metal atom $M_2$, in which the metal atom $M_1$ is at least one selected from the group consisting of vanadium, chromium, molybdenum, tungsten, manganese, iron, ruthenium, cobalt, nickel, platinum, and copper; and the metal atom $M_2$ is at least one selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium; and a ligand L is one kind, two kinds, or more kinds of compounds represented by formulae (1) to (3):

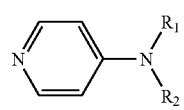

formula (1)

wherein, in the formula, $R_1$ and $R_2$ each independently represent a hydrogen atom or an alkenyl group having 8 or more carbon atoms,

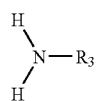

formula (2)

wherein, in the formula, $R_3$ represents an alkenyl group having 8 or more carbon atoms, and

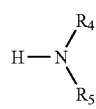

formula (3)

wherein, in the formula, $R_4$ represents an alkyl group having 6 or more carbon atoms, and $R_5$ represents an alkyl group or an alkenyl group; and wherein the ligand L is bonded to said crystal for being superfine particles in an average particle diameter of 50 nm or less.

10. Superfine particles of a Prussian-blue-structure metal complex, comprising:

a crystal of a Prussian-blue-structure metal complex comprising a metal atom $M_1$ and a metal atom $M_2$, in which the metal atom $M_1$ is at least one selected from the group consisting of vanadium, chromium, molybdenum, tungsten, manganese, iron, ruthenium, cobalt, nickel, platinum, and copper; and the metal atom $M_2$ is at least one selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium, wherein the ligand L is one or more amino-groups, and wherein the ligand L is bonded to said crystal for being superfine particles in an average particle diameter of 50 nm or less.

11. Superfine particles of a Prussian-blue-structure metal complex, comprising:

a crystal of a Prussian-blue-structure metal complex comprising a metal atom $M_1$ and a metal atom $M_2$, in which the metal atom $M_1$ is at least one selected from the group consisting of vanadium, chromium, molybdenum, tungsten, manganese, iron, ruthenium, cobalt, nickel, platinum, and copper; and the metal atom $M_2$ is at least one selected from the group consisting of vanadium, chromium, manganese, iron, ruthenium, cobalt, rhodium, nickel, palladium, platinum, copper, silver, zinc, lanthanum, europium, gadolinium, lutetium, barium, strontium, and calcium, wherein the ligand L is one or more pyridine-groups, and wherein the ligand L is bonded to said crystal for being superfine particles in an average particle diameter of 50 nm or less.

* * * * *